Patented Nov. 28, 1950

2,532,243

UNITED STATES PATENT OFFICE 2,532,243

POLYETHYLENE FOAMS

John B. Ott, Dayton, Ohio, assignor to Monsanto Chemical Company, St. Louis, Mo., a corporation of Delaware No Drawing. Application July 9, 1949,
Serial No. 103,965

4 Claims. (Cl. 260—2.5)

This invention relates to foam resins. More particularly it relates to foam polymers and copolymers of ethylene.

One object of this invention is to provide foamed polyethylene resins.

Another object is to provide fusible but insoluble polyethylene foams.

Still another object is to provide a process for preparing insoluble polyethylene foams.

These and other objects are attained by incorporating diphenyl-4,4'-di(sulfonyl azide) in a polymerized ethylene resin and thereafter heating the mixture at 140 to 150° C.

The following example is given in illustration and is not intended as a limitation on the scope of this invention.

Example I

A polymerized ethylene in particulate form having a molecular weight of about 15,000 was mixed dry with 4% by weight of diphenyl-4,4'-di(sulfonyl azide). The mixture was malaxated on hot milling rolls at about 100 to 120° C. until the diphenyl-4,4'-di(sulfonyl azide) was thoroughly dispersed throughout the polyethylene resin. The product was an opaque mass which showed no signs of decomposition or foam production. It was soluble in xylene. The opaque mass was heated in an open mold of aluminum at about 145° C. for about 80 minutes to produce a tough, gray, flexible foam of extremely low density. The foamed resin was substantially insoluble in xylene even at 95° C. and yet it was still fusible at 150° C. The foamed resin showed extremely good adhesion to the aluminum mold.

Diphenyl-4,4'-di(sulfonyl azide) is a new compound which is described and claimed in my co-pending application, Serial No. 103,962, filed July 9, 1949 now U. S. Patent 2,518,249. The compound may be prepared by reacting diphenyl with chlorosulfonic acid or sulfuryl chloride followed by reaction with an inorganic azide. It is stable at temperatures up to 140° C. and its decomposition between 140 and 150° C. may be easily controlled. Its stability at temperatures below 140° C. make it particularly valuable for incorporation into polyethylene resins since such incorporation is preferably carried out at elevated temperatures, i. e., about 100 to about 135° C. by malaxation on heated roll mills, in heated Banbury mixers or other conventional milling machines.

The amount of azide to be used may be varied between about 1% to 25% or more by weight based on the total weight of the resin. Less than 1% is ineffective both for forming foams and for insolubilizing the resin. About 25%, little advantage is gained by using the excess. Between 1 and 25%, the amount used will depend on the required properties of the finished foams. Larger quantities produce foams having lower specific gravities if the foaming takes place in an open mold. In a closed mold the larger quantities develop more and smaller bubbles. Conversely, quantities near the lower point of the critical range yield foams having higher specific gravities. Furthermore, the amount of azide used will determine the degree of cross-linking obtained. At 25% azide, the foams will be rigid and brittle. At 4% azide, tough resilient foams may be obtained which are insoluble in known solvents for the resins.

The temperature of the foaming step will also affect the type and nature of the foams produced. The foaming step must be carried out at 140 to 150° C. Below 140° C., substantially no decomposition of the azide occurs. Above 150° C., decomposition becomes uncontrollable and reproducible results cannot be obtained. Whereas temperatures as low as 140° C. may be used, the time cycle is unnecessarily long. It is preferred to foam the resins at 144 to 146° C. which is the temperature at which the pure azide decomposes spontaneously when placed on a melting point bar. In this temperature range the decomposition is rapid but does not get out of hand and results obtained are easily reproducible.

The foam resins of this invention are polymers of ethylene or copolymers thereof in which the ethylene constitutes at least 60% by weight of the total. Furthermore, the invention is restricted to such ethylene polymers and copolymers which are useful as molding powders, more particularly polymers and copolymers having an average molecular weight of between 10,000 and 30,000 as determined by the Staudinger equation. Materials which may be copolymerized with ethylene to produce resins useful in this invention are other olefins such as propylene, isobutylene, pentadiene, etc.; diolefins such as butadiene, isoprene, piperylene, cyclopentadiene, etc.; aromatic mono olefins such as styrene, vinyl naphthalene, vinyl anthracene, and the polymerizable ring substituted and side chain substituted derivatives thereof; vinylidene compounds including vinyl esters, vinyl halides, vinylidene halides, acrylic and alpha substituted acrylic acids and the esters, amides and nitriles thereof; alpha beta ethylenically unsaturated dibasic acids such as maleic acid, fumaric acid, itaconic acid and derivatives thereof including other esters, amides and nitriles. A further restriction of the copolymers of this invention is that they must be fusible at 100 to 150° C.

The ethylene polymers and copolymers may be modified by the addition of conventional ingredients such as plasticizers, pigments, dyes, fillers, lubricants, etc. prior to foaming operation.

The process and products of this invention are particularly advantageous in that the process permits the preparation of insoluble foams from soluble thermoplastic ethylene polymers and copolymers under controlled conditions and the products are stable foams having all the valuable properties of ethylene resins without the disadvantages of solubility.

The foamed resins may be used for insulation in refrigerators and deep freeze units. They may also be employed as fillers for lifebelts, buoys and other apparatus designed to be buoyant in water over long periods of time.

It is obvious that many variations may be made in the products and processes of this invention without departing from the spirit and scope thereof as defined in the appended claims.

What is claimed is:

1. A process for preparing an insoluble foamed product which comprises mixing from 1 to 25 parts of diphenyl-4,4'-di(sulfonyl azide) with 100 parts of a polyethylene resin and then heating the mixture at 140 to 150° C.

2. A process as in claim 1 wherein the polyethylene resin is a fusible copolymer of ethylene with an unsaturated monomer copolymerizable therewith, said copolymer containing at least 60% by weight of ethylene.

3. An insoluble foam product comprising polyethylene, said product having been prepared by heating a mixture of 100 parts of polyethylene and from 1 to 25 parts of diphenyl-4,4'-di(sulfonyl azide) at 140 to 150° C.

4. A product as in claim 3 wherein the polyethylene resin is a fusible copolymer of ethylene in which the ethylene constitutes at least 60% by weight of the copolymer.

JOHN B. OTT.

REFERENCES CITED

The following references are of record in the file of this patent:

UNITED STATES PATENTS

| Number | Name | Date |
| --- | --- | --- |
| 2,256,483 | Johnston | Sept. 23, 1941 |